US012748522B2

(12) United States Patent
Wan et al.

(10) Patent No.: US 12,748,522 B2
(45) Date of Patent: Sep. 29, 2026

(54) EMOJI DISPLAY METHOD AND APPARATUS, AND DEVICE AND STORAGE MEDIUM

(71) Applicant: Beijing Zitiao Network Technology Co., Ltd., Beijing (CN)

(72) Inventors: Shiqi Wan, Beijing (CN); Xiaokang Shen, Beijing (CN); Xin Song, Beijing (CN); Weiyi Chang, Beijing (CN); Yuxuan Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 173 days.

(21) Appl. No.: 18/569,990

(22) PCT Filed: Sep. 23, 2022

(86) PCT No.: PCT/CN2022/121045
§ 371 (c)(1),
(2) Date: Dec. 13, 2023

(87) PCT Pub. No.: WO2023/056847
PCT Pub. Date: Apr. 13, 2023

(65) Prior Publication Data

US 2024/0281113 A1 Aug. 22, 2024

(30) Foreign Application Priority Data

Oct. 8, 2021 (CN) .......................... 202111171471.5

(51) Int. Cl.
*G06F 3/04817* (2022.01)
*G06F 3/0482* (2013.01)
*G06T 13/00* (2011.01)

(52) U.S. Cl.
CPC ........ *G06F 3/04817* (2013.01); *G06F 3/0482* (2013.01); *G06T 13/00* (2013.01)

(58) Field of Classification Search
CPC .... G06F 3/04817; G06F 3/0482; G06T 13/00
See application file for complete search history.

(56) References Cited

U.S. PATENT DOCUMENTS

2010/0306249 A1 12/2010 Hill et al.
2015/0334067 A1* 11/2015 Zonka ................ G06F 3/04817 715/752

(Continued)

FOREIGN PATENT DOCUMENTS

CN 102289339 A 12/2011
CN 104410561 A 3/2015

(Continued)

OTHER PUBLICATIONS

ISA China National Intellectual Property Administration, International Search Report Issued in Application No. PCT/CN2022/121045, Dec. 21, 2022, WIPO, 10 pages.

(Continued)

*Primary Examiner* — Seth A Silverman
(74) *Attorney, Agent, or Firm* — Alleman Hall LLP

(57) ABSTRACT

Provided in the present disclosure are an emoji display method and apparatus, and a device and a storage medium. The emoji display method provided in the present disclosure comprises: displaying at least one preset masked icon on an input panel of a conversation interface; and displaying a first emoji in a first emoji set on the input panel, responsive to a triggering on the preset masked icon, to switch the preset masked icon.

19 Claims, 12 Drawing Sheets

(56) References Cited

U.S. PATENT DOCUMENTS

| | | | | |
|---|---|---|---|---|
| 2016/0291822 | A1* | 10/2016 | Ahuja | H04L 51/52 |
| 2017/0018289 | A1 | 1/2017 | Morgenstern | |
| 2017/0357443 | A1* | 12/2017 | Paek | G06F 3/0482 |
| 2021/0096729 | A1* | 4/2021 | Dalonzo | G06F 3/04845 |

FOREIGN PATENT DOCUMENTS

| | | | |
|---|---|---|---|
| CN | 104780093 | A | 7/2015 |
| CN | 105357466 | A | 2/2016 |
| CN | 106406698 | A | 2/2017 |
| CN | 107544730 | A | 1/2018 |
| CN | 107566243 | A | 1/2018 |
| CN | 108427588 | A | 8/2018 |
| CN | 108845741 | A | 11/2018 |
| CN | 109656653 | A | 4/2019 |
| CN | 109871165 | A | 6/2019 |
| CN | 110377199 | A | 10/2019 |
| CN | 110414404 | A | 11/2019 |
| CN | 106527864 | B | 1/2020 |
| CN | 111193657 | A | 5/2020 |
| CN | 111369645 | A | 7/2020 |
| CN | 112445348 | A | 3/2021 |
| CN | 113032273 | A | 6/2021 |
| CN | 113157157 | A | 7/2021 |
| CN | 113867876 | A | 12/2021 |
| WO | 2018023878 | A1 | 2/2018 |
| WO | 2019015522 | A1 | 1/2019 |
| WO | 2021013125 | A1 | 1/2021 |

OTHER PUBLICATIONS

China National Intellectual Property Administration, Office Action and Search Report Issued in Application No. 202111171471.5, Aug. 10, 2023, 9 pages.

* cited by examiner

Fig. 6
XXX
Online
XXXXXXXXXXXX
XXXXXXXXXXXXXXX
Pumpkin
Ghost
Halloween hat
Candy
Big smile
Grinning
Sad
Angry
Yell
Joyful
Happy
Frowny

Fig. 7
XXX
Online
XXXXXXXXXXXX
XXXXXXXXXXXXXXX
Pumpkin
Ghost
Halloween hat
Candy
00:04
00:08
Big smile
Grinning
Sad
Angry
Yell
Joyful
Happy
Frowny

Fig. 8
XXX
Online
XXXXXXXXXXXXX
Pumpkin
Ghost
Halloween hat
Candy
Big smile
Grinning
Sad
Angry
Yell
Joyful
Happy
Frowny

Fig. 9
XXX
Online
XXXX
Pumpkin
Ghost
Halloween hat
Candy
Big smile
Grinning
Sad
Angry
Yell
Joyful
Happy
Frowny

EMOJI DISPLAY METHOD AND APPARATUS, AND DEVICE AND STORAGE MEDIUM

CROSS-REFERENCE TO RELATED APPLICATION(S)

This application is a U.S. National Stage Application of PCT Application Serial No. PCT/CN2022/121045, filed Sep. 23, 2022, which claims priority to Chinese Application No. 202111171471.5 titled "Emoji Display Method and Apparatus, and Device and Storage Medium" filed on Oct. 8, 2021, the disclosures of which are incorporated herein by reference in their entireties.

FIELD

The disclosure relates to information interaction, and more particularly relates to a method of emoji display, an apparatus therefor, a device, a memory medium, a computer program product, and a computer program.

BACKGROUND

With advancement in network technologies, social networking has become an integral part of people's life. Various kinds of social media applications have an emoji input feature to aid users to express their emoji vividly and accurately in a network. Emoji are an integral aspect of social networking.

In relevant technologies, emoji of different themes, after being downloaded by a user or recommended to the user by an application, may be added to an input panel of a conversation interface of a social application, so that in a chat, the user may select an appropriate emoji to be sent to the conversation interface.

SUMMARY

The disclosure provides a method of emoji display, an apparatus therefor, a device, a storage medium, a computer program product, and a computer program.

In a first aspect, embodiments of the disclosure provide a method of emoji display, comprising:

- displaying, on an input panel of a conversation interface, at least one preset masked icon; and
- displaying a first emoji in a first emoji set on the input panel, responsive to a triggering on the preset masked icon, to switch the preset masked icon.

In a second aspect, embodiments of the disclosure provide an apparatus for emoji display, comprising:

- a displaying module configured to display, on an input panel of a conversation interface, at least one preset masked icon;
- a switching module configured to display a first emoji in a first emoji set on the input panel, responsive to a triggering on the preset masked icon, to switch the preset masked icon.

In a third aspect, embodiments of the disclosure provide an electronic device, comprising:

- a processor; and
- a memory having a computer program stored thereon;
- wherein the processor is configured to execute the computer program to perform the method of emoji display according to the first aspect noted supra and various possible designs of the first aspect.

In a fourth aspect, embodiments of the disclosure provide a computer-readable storage medium with a computer-executed instruction stored thereon, wherein the computer-executed instruction, when being executed by a processor, performs the method of emoji display according to according to the first aspect noted supra and various possible designs of the first aspect.

In a fifth aspect, embodiments of the disclosure provide a computer program product, comprising a computer program, wherein the computer program, when being executed by a processor, performs the method of emoji display according to the first aspect noted supra and various possible designs of the first aspect.

In a sixth aspect, embodiments of the disclosure provide a computer program, wherein the computer program, when being executed by a processor, performs the method of emoji display according to the first aspect noted supra and various possible designs of the first aspect.

Embodiments of the disclosure provide a method of emoji display, an apparatus therefor, a device, a storage medium, a computer program product, a the computer program, so that by displaying, on an input panel of a conversation interface, at least one preset masked icon, a first emoji in a first emoji set on the input panel is played, responsive to a triggering on the preset masked icon, to switch the preset masked icon.

BRIEF DESCRIPTION OF THE DRAWINGS

To illustrate the technical solutions in embodiments of the disclosure or in conventional technologies, the drawings referred to in the embodiments or conventional technologies will be briefly introduced infra. It is apparent that the drawings referred to hereinafter are only some embodiments of the disclosure, and to those skilled in the art, other drawings may also be derived from these drawings without exercise of inventive work.

DETAILED DESCRIPTION OF EMBODIMENTS

Figure 1:
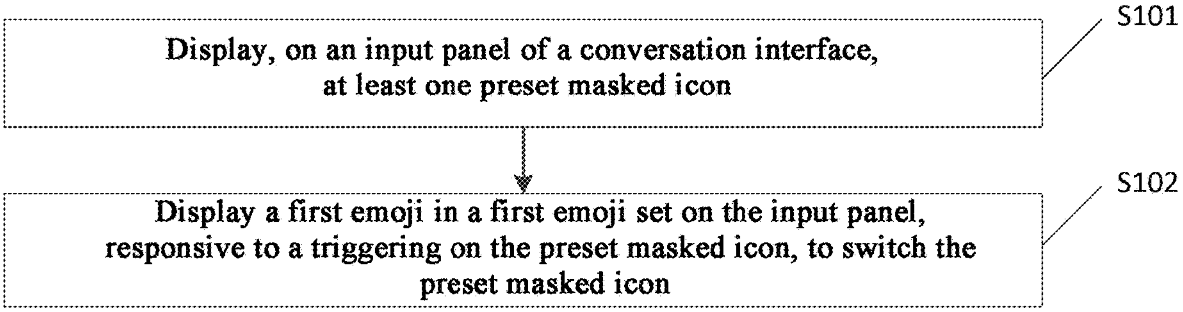
FIG. 1 is a flow diagram of a method of emoji display according to an example embodiment of the disclosure.

Hereinafter, embodiments of the disclosure will be described in more detail with reference to the accompanying drawings. Although some example embodiments of the disclosure have been illustrated in the drawings, it is understood that the disclosure may be implemented in various forms, not limited to the example embodiments depicted herein; instead, provision of these example embodiments is intended for a more thorough and comprehensive understanding of the disclosure. It is understood that the accompanying drawings and example embodiments provided herein are only for illustrative purposes, not for limiting the scope of protection of the disclosure.

It is understood that the various steps recited in method embodiments of the disclosure may be performed sequentially and/or concurrently. In addition, the method embodiments may comprise additional steps and/or omit some steps illustrated. The scope of the disclosure is not limited thereto.

The term "comprise" and its variants used herein refer to an open inclusion, i.e., "including, but not limited to." The term "based on" refers to "at least partially based on." The term "one embodiment" refers to "at least one embodiment"; the term "another embodiment" refers to "at least one further embodiment"; and the term "some embodiment" refers to "at least some embodiments." Relevant definitions of other terms will be provided in the description infra.

It is noted that, modifiers "one" and "a plurality of" referred to herein are schematic, not limitative; those skilled in the art shall understand, they mean "one or more," unless otherwise specifically indicated.

In relevant technologies, emoji of different themes, after being downloaded by a user or recommended by an application to the user, may be added to an input panel of a conversation interface of a social application, so that in chat, the user may select an appropriate emoji to be sent on the conversation interface. However, it is monotonic to directly display a newly added emoji on the input panel of the conversation interface, which also has a low interactivity with the user in the emoji adding process.

To address the technical problems noted supra, the disclosure intends to first display, when adding an emoji, a preset masked icon on an input panel of a conversation interface, and then display, responsive to a trigger operation (e.g., an operation such as clicking and sliding) performed by the user on the preset masked icon, the masked icon to the added emoji. This approach may avoid a monotonic display effect of the added emoji on the input panel of the conversation interface, thereby enriching display effect of the added emoji and enhancing interactivity with the user in the emoji adding process. It is understood that, the conversation interface herein may include an instant conversation or a non-instant conversation; in the case of instant conversation, the conversation interface is for example a chat interface of instant messaging, and in the case of of non-instant conversation, the conversation interface is for example a comment or a reply, etc.

In one application scenario of an emoji display method, the method of emoji display according to this embodiment may be applied to for example an instant messaging scenario; when the user intends to perform an emoji adding operation during a conversation in the instant messaging scenario, he/she may first display a preset masked icon on an input panel of the conversation interface; after the user performs a trigger operation on the preset masked icon, the newly added emoji is displayed.

In another application scenario of an emoji display method, the method of emoji display may also be applied to a non-instant conversation scenario, e.g., a question-answer community. For a question in a question-answer community, a replier may input a reply via an input panel. To add an emoji in the input panel, a preset masked icon may be first displayed, and after the user's trigger operation on the preset masked icon, the newly added emoji is displayed.

It is noted that, the above two application scenarios do not amount to limitations to the disclosure. The method of emoji displaying provided herein may be applied to any scenario with a need of adding an emoji.

It is understood that, the method of emoji display may be implemented by an apparatus for emoji display provided according to embodiments of the disclosure; the apparatus for emoji display may be part or an entirety of a device, e.g., a terminal device or a processor of the terminal device.

Hereinafter, the technical solutions of the embodiments of the disclosure will be described in detail through specific embodiments. The specific embodiments to be described infra may be combined with each; and same or similar concepts or processes may not be repeated in some embodiments.

FIG. 1 is a flow diagram of a method of emoji display according to an example embodiment of the disclosure. As illustrated in FIG. 1, the method of emoji display according to this embodiment comprises:

Step 101: at least one preset masked icon is displayed on an input panel of a conversation interface.

The preset masked icon herein refers to an icon that may be switched to display upon a trigger operation.

In embodiments of the disclosure, a pattern of the preset masked icon may be set by a user or by a software developer, which is not limited in the embodiments of the disclosure. In a case of presence of a plurality of preset masked icons, their patterns may be identical or different.

The conversation interface herein refers to a interface for transmitting and receiving messages when communicating with other objects. The conversation interface may include an input panel, the input panel allowing for the user to input a message on the conversation interface.

It is understood that, embodiments of the disclosure have no limitations on a message type inputted in the input panel. Exemplarily, textual information, voice information, pictures, and emoji may be inputted via the input panel.

It is understood that, embodiments of the disclosure have no limitations on how to display a preset masked icon on the input panel. In some embodiments, in a case of a need to display a preset masked icon on the input panel of the conversation interface, the input panel may be automatically switched to an emoji sending unit, the preset masked icon being displayed in the emoji sending unit. In some other embodiments, the user needs to trigger a control on the input panel to switch the input panel to the emoji sending unit; in this case, if a to-be-displayed preset masked icon is present, the preset masked icon may be displayed in the emoji sending unit.

It is noted that, embodiments of the disclosure have no limitations on a display position of the preset masked icon. Exemplarily, the preset masked icon may be displayed on top of the input panel; alternatively, the preset masked icon may be displayed at bottom of the input panel.

Figure 2:
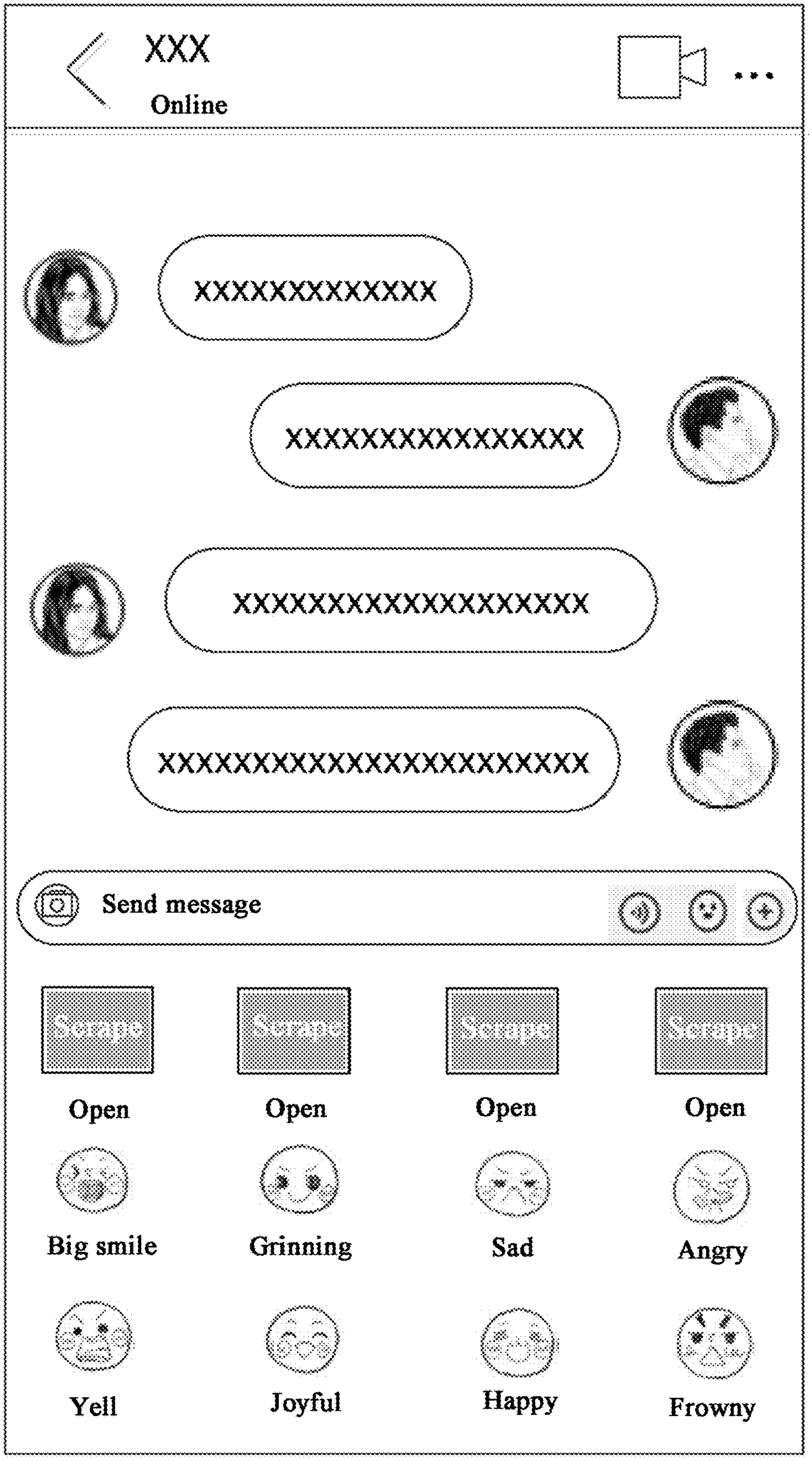
FIG. 2 is a schematic diagram of a preset masked icon according to an example embodiment of the disclosure.

Exemplarily, FIG. 2 is a schematic diagram of a preset masked icon according to an example embodiment of the disclosure. As illustrated in FIG. 2, four preset mask icons are provided on the input panel of the conversation interface, which are displayed on top. Prompt information "open" is provided beneath each of the preset masked icon to alert the user to perform a trigger operation by clicking the four preset masked icons, whereby the preset masked icons are switched to emoji.

Hereinafter, illustration will be made on when to display the at least one preset masked icon on the input panel of the conversation interface.

In embodiments of the disclosure, a display instruction for a first emoji set may be triggered if a preset condition is satisfied; and responsive to the display instruction for the first emoji set, at least one preset masked icon may be displayed on the input panel of the conversation interface.

The first emoji set herein may be an emoji set of any theme, including at least one emoji. Exemplarily, the first emoji set may be a Halloween emoji set, including a pumpkin emoji, a ghost emoji, a garlic emoji, and a candy emoji. Exemplarily, the first emoji set may be a Spring Festival emoji set, which may include a firecracker emoji, a red packet emoji, a Fu-character emoji, and a Spring Festival couplets emoji.

Embodiments of the disclosure have no limitations on the preset condition, which may be set dependent on specific circumstances.

In some embodiments, in a case that a second emoji is received in a target conversation on the conversation interface, if the second emoji belongs to a second emoji set, the display instruction for the first emoji set is triggered.

Herein, the second emoji set includes the first emoji set, or the second emoji set is associated with the first emoji set.

Exemplarily, if the preset second emoji set includes a pumpkin emoji, a ghost emoji, a garlic emoji, a candy emoji, and a vampire emoji, since the second emoji set includes the first emoji set, or the second emoji set is associated with the first emoji set, both of which belong to ghost-series emoji, when the user receives any emoji (e.g., a ghost emoji) in the second emoji set in the target conversation on the conversation interface, the display instruction for the first emoji set may be triggered.

In some other embodiments, a terminal device may obtain current time; if the current time is within a target time slot, the display instruction for the first emoji set is triggered, wherein the first emoji set is associated with the target time slot.

The current time may be obtained from a system time of the terminal device, or may be obtained via a network server, which is not limited herein. The target time slot may be a time slot corresponding to a theme of the first emoji set. For example, in a case that the first emoji set is a festival emoji set, the target time slot is a date corresponding to the festival.

Exemplarily, the target time slot associated with the Halloween emoji set may be from October 30 to November 1, and the target time slot associated with the New Year's Day emoji set may be from December 30 to January 1.

Exemplarily, if the terminal device obtains that the current time is October 31, it is determined that the current time is in the target time slot associated with the Halloween emoji set, so that the display instruction for the Halloween emoji set may be triggered.

In some embodiments, the terminal device may further obtain a preset theme based on a target setting of a user of the target conversation on the conversation interface and/or based on input by the user. If a trigger condition corresponding to the preset theme is satisfied, the display instruction for the first emoji set is triggered. The preset theme is associated with the first emoji set.

The user's target setting may be an anniversary or a special day set by the user, and the user input may be specific time inputted by the user.

Exemplarily, in a case that the user sets a wedding anniversary in the target conversation on the conversation interface, he/she may correspondingly obtain a wedding anniversary theme on the wedding anniversary day, so that a display instruction for the first emoji set associated with the wedding anniversary theme is triggered.

Embodiments of the disclosure have no limitations on the number of preset masked icons. In some embodiments, the number of preset masked icons may be equal to the number of emoji in the to-be-displayed emoji set. Exemplarily, in a case that the first emoji set includes five emoji, the five preset emoji icons are correspondingly displayed on the input panel.

In some embodiments, the number of preset masked icons may be smaller than the number of emoji in the to-be-displayed first emoji set. Correspondingly, a preset number of emoji may be randomly determined from the first emoji set, so as to be used as to-be-displayed emoji, the preset number of preset masked icons being displayed on the input panel. Exemplarily, in a case that the first emoji set includes five emoji, four emoji thereof may be randomly selected as to-be-displayed emoji; correspondingly, four preset masked emoji are displayed on the input panel.

Step 102: responsive to a trigger operation on the preset masked icon, the preset masked icon is switched to a first emoji the first emoji set, the first emoji being displayed on the input panel.

It is understood that, embodiments of the disclosure have no limitations on the trigger operation on the preset masked icon. Exemplarily, the trigger operation may refer to a single-click operation, a double-click operation, a sliding operation, etc.

In some embodiments, responsive to a trigger operation on the preset masked icon, an animated effect of switching the preset masked icon to a first emoji in the first emoji set and displaying the first emoji may also be presented.

Figure 3:
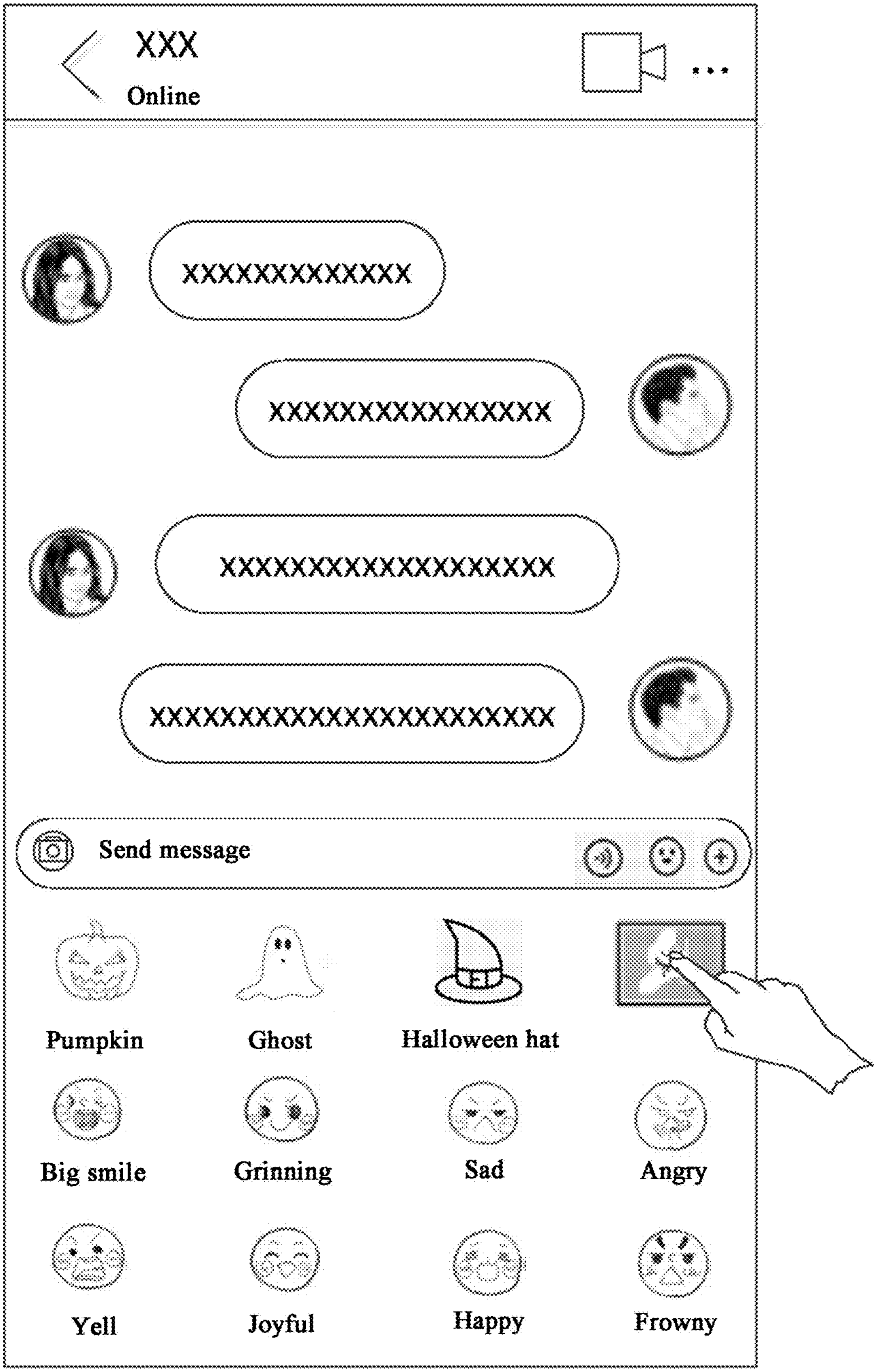
FIG. 3 is a schematic diagram of an animated effect of switching a preset masked icon to display according to an example embodiment of the disclosure.
Figure 4:
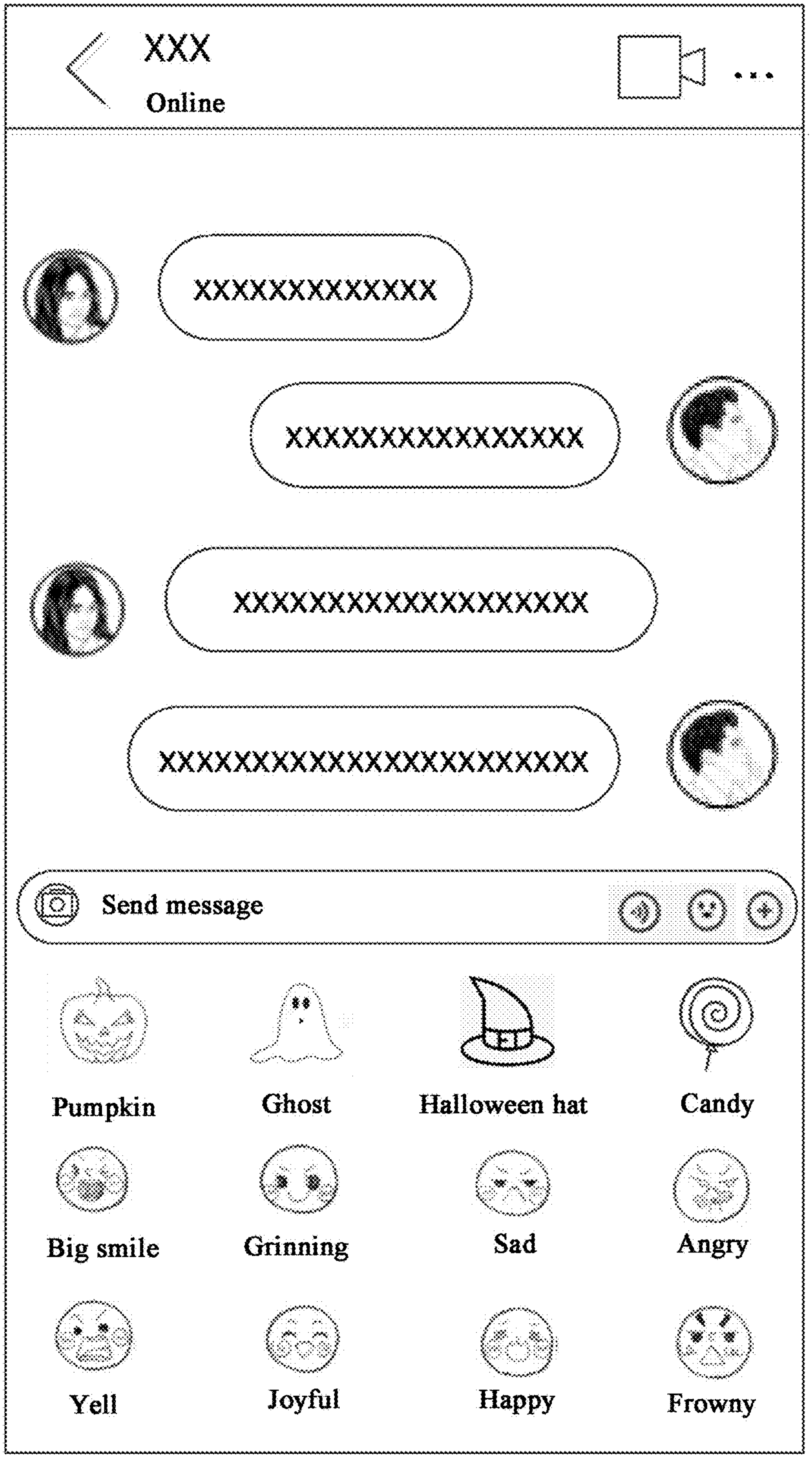
FIG. 4 is a schematic diagram of a schematic diagram of display of the post-switch preset masked icon according to an example embodiment of the disclosure.

Exemplarily, FIG. 3 is a schematic diagram of an animated effect of switching a preset masked icon to display according to an example embodiment of the disclosure; and FIG. 4 is a schematic diagram of display of the post-switch preset masked icon according to an example embodiment of the disclosure. After the preset masked icon illustrated in FIG. 2 is subjected to a trigger operation performed by the user, e.g., clicked by the user, an animated effect of scratching off the preset masked icon may be presented at the preset masked icon, as illustrated in FIG. 3; for another example, after the user performs a back-and-forth sliding operation on the preset masked icon, an animated effect of the preset masked icon being gradually scratched off with the sliding operation may be presented at the preset masked icon. After the animated effect is completely presented, the preset masked icon may be switched to display the candy icon in the first icon set, as illustrated in FIG. 4.

In some embodiments, after the preset masked icon is switched to display the first icon in the first icon set on the input panel, user selection is performed before sending the first icon in the target conversation on the conversation interface. In some other embodiments, the first icon may be directly sent to the target conversation on the conversation interface upon switching the preset masked icon to display the first icon in the first icon set on the input panel.

The method of icon display provided according to embodiments of the disclosure comprises: displaying at least one preset masked icon on an input panel of a conversation interface and displaying a first emoji in a first emoji set on the input panel, responsive to a triggering on the preset masked icon, to switch the preset masked icon. In this way, to add an icon, a preset masked icon may be first displayed, and after the user performs a trigger operation on the preset masked icon, the preset masked icon is switched to a corresponding icon to display, which enriches the display effect of the added icon and enhances interactivity with the user in the icon adding process.

Figure 5:
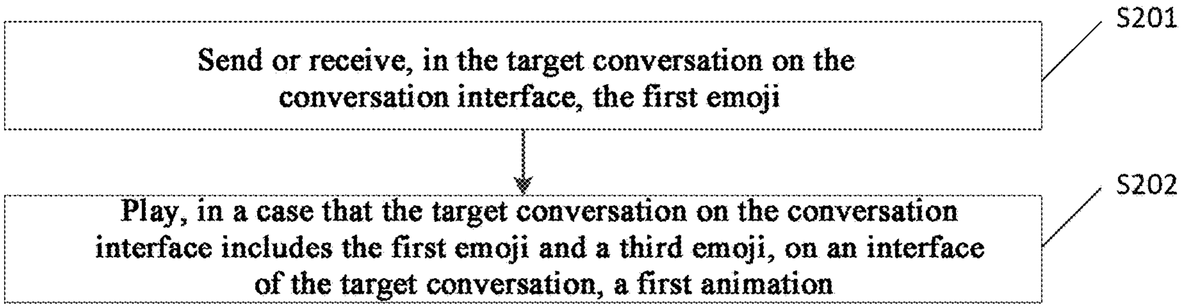
FIG. 5 is a flow diagram of a method of emoji display according to another example embodiment of the disclosure.
Figure 6:
FIG. 6 is a schematic diagram of emoji-superimposed animation according to an example embodiment of the disclosure.

FIG. 5 is a flow diagram of a method of emoji display according to another example embodiment of the disclosure. FIG. 6 is a schematic diagram of emoji-superimposed animation according to an example embodiment of the disclosure. As illustrated in FIG. 5 and FIG. 6, a method of emoji display according to this embodiment comprises:

Step 201: a first emoji is sent or received in a target conversation on a conversation interface.

Step 202: in a case that the target conversation on the conversation interface comprises a first emoji and a third emoji, a first animation is played on an interface of the target conversation.

The first animation herein is an animation associated with the first emoji and the third emoji. Exemplarily, the first animation may be an animation presenting a superimposed effect of the first emoji and the third emoji.

It is understood that, in some embodiments, any two emoji in the target conversation may be superimposed, so that an animation associated with the two emoji is played on the interface of the target conversation.

In some other embodiments, a prerequisite for superimposing two emoji is that two icons in the target conversation are associated or the two icons in the target conversation belong to a same icon set, with an animation associated with the two emoji being played. Exemplarily, a prerequisite for playing the first animation is that the third icon belongs to the second icon set and the second icon set includes the first icon set, or the second icon set is associated with the first icon set, and the target conversation includes both of the first emoji and the third emoji.

Exemplarily, referring to FIG. 6, when a party in the target conversation sends a ghost emoji and another party sends a candy emoji, since the ghost emoji and the candy emoji both belong to the Halloween emoji set, an amination superimposed by the ghost emoji and the candy emoji may be correspondingly played, e.g., an animation of the ghost eating the candy.

It is noted that the emoji sender in the target conversation has no impact on the animation corresponding to a combination of emoji. Exemplarily, for emoji A and emoji B in a same emoji set, emoji A and emoji B may be sent by the same sender in the target conversation, or may be sent by different parties in the target session, both circumstances corresponding to the same animation.

Exemplarily, in a case that a party in the target session sends the ghost emoji and the candy emoji in succession, since the ghost emoji and the candy emoji both belong to the Halloween emoji set, the superimposed animation of the ghost emoji and the candy emoji may be played.

Hereinafter, an interactive process with a user while the first animation is being played will be explained.

In some example embodiments, while the first animation is being played, responsive to a first interactive operation on the first animation, the first animation which is played till a preset time node is redirected to a second animation to play the second animation.

The first interactive operation refers to an operation on a first play region of the first animation, and the second animation refers to a feedback animation responsive to the first interactive operation.

Exemplarily, the first interactive operation may comprise an operation such as clicking or sliding on preset play of the first animation. Correspondingly, responsive to the first interactive operation of the user, it may be adjusted to play the second animation at a preset play node of the first animation, thereby rendering a feedback effect.

The preset play node of the first animation herein may be set dependent on different animations, which, for example, may be end of the first animation.

Figure 7:
FIG. 7 is a schematic diagram of a first interactive operation according to an example embodiment of the disclosure.
Figure 8:
FIG. 8 is a schematic diagram of a second animation according to an example embodiment of the disclosure.

Exemplarily, FIG. 7 is a schematic diagram of a first interactive operation according to an example embodiment of the disclosure, and FIG. 8 is a schematic diagram of a second animation according to an example embodiment of the disclosure. As illustrated in FIG. 7, the first animation is a ghost eating candy; while the first animation is being played, the user slides in the candy region to trigger the first interactive operation, whereby the first animation which is played till a preset time node is redirected to a second animation to display the second animation.

In some other embodiments, responsive to a second interactive operation on the first animation, a first task for the first animation is triggered, the first task including at least one of: recording a first animation, saving the first animation, sharing the first animation, and adjusting progress of the first animation.

The second interactive operation herein may include operations such as clicking, and pressing and holding.

It is understood that embodiments of the disclosure are not limited to superimposition of two emoji. In some embodiments, a fourth emoji may be sent or received in the target conversation on the conversation interface. In a case that the target conversation on the conversation interface includes a first emoji, a third emoji, and a fourth emoji, a second animation is played on the interface of the target conversation.

The second animation herein refers to an animation associated with the first emoji, the third emoji, and the fourth emoji, of which the third emoji and the fourth emoji both belong to the second emoji set.

Exemplarily, the emoji A, emoji B, and emoji C all belong to the second emoji set. In a case that the target conversation includes emoji A and emoji B, a superimposed amination of emoji A and emoji B may be played on the interface of the target conversation. Then, if the user sends or receives emoji C in the target conversation, the emoji C may be continuously superimposed with emoji A and emoji B, and correspondingly, a superimposed animation of emoji A, emoji B, and emoji C may be played.

Figure 9:
FIG. 9 is a schematic diagram of a three-emoji superimposed animation according to an example embodiment of the disclosure.

FIG. 9 is a schematic diagram of a three-emoji superimposed animation according to an example embodiment of the disclosure. As illustrated in FIG. 9, in a case that the target conversation includes both of the ghost emoji and the candy emoji and a Halloween emoji is subsequently sent, an animation showing the ghost wearing a Halloween hat is eating candy may be played on the interface of the target conversation.

It is understood that, in embodiments of the disclosure, if playing of a second animation is triggered while the first animation is being played, a play interval between the first animation and the second animation is longer than a preset time length.

The preset time length herein may be set dependent on specific circumstances, e.g., 3 seconds, 5 seconds, etc.

It is understood that, in embodiments of the disclosure, triggering play of the second animation is suspended while playing the second animation. Namely, the second animation is not played while playing the second animation.

Correspondingly, in embodiments of the disclosure, triggering play of a third animation is also suspended while the first animation is being played. The third animation is associated with the third emoji and the fourth emoji, the third emoji and the fourth emoji both belong to the second emoji set.

It is noted that, the sequence of sending the emoji in the target conversation has no impact on the corresponding animation superimposed by the emoji. Exemplarily, emoji A and emoji B in the same emoji set correspond to the same animation, irrespective of which comes first.

Optionally, the first animation, the second animation, and the third animation will automatically disappear after being completely played.

Optionally, the first animation, the second animation, and the third animation, while being played, do not block the user's operation on the conversation interface, so that the user may conduct conversation normally on the conversation interface.

In a case that the target conversation on the conversation interface includes a first emoji and a third emoji, the method of emoji display provided according to embodiments of the disclosure enables play of a first animation associated with the first emoji and the third emoji on the interface of the target conversation, whereby emoji interactivity is enhanced, and fun of conversation is improved.

Figure 10:
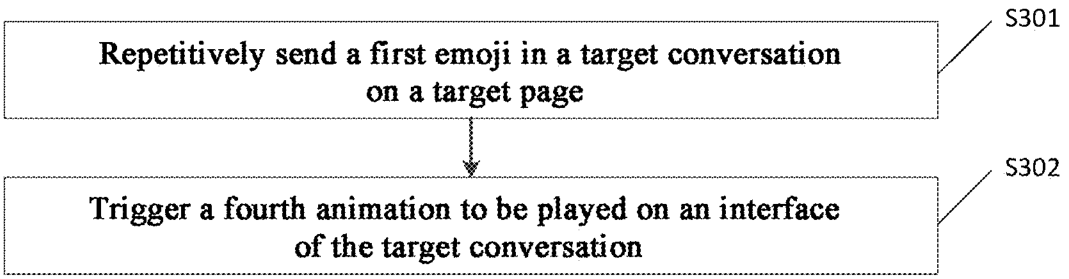
FIG. 10 is a flow chart of a method of emoji display according to a further example embodiment of the disclosure.
Figure 11:
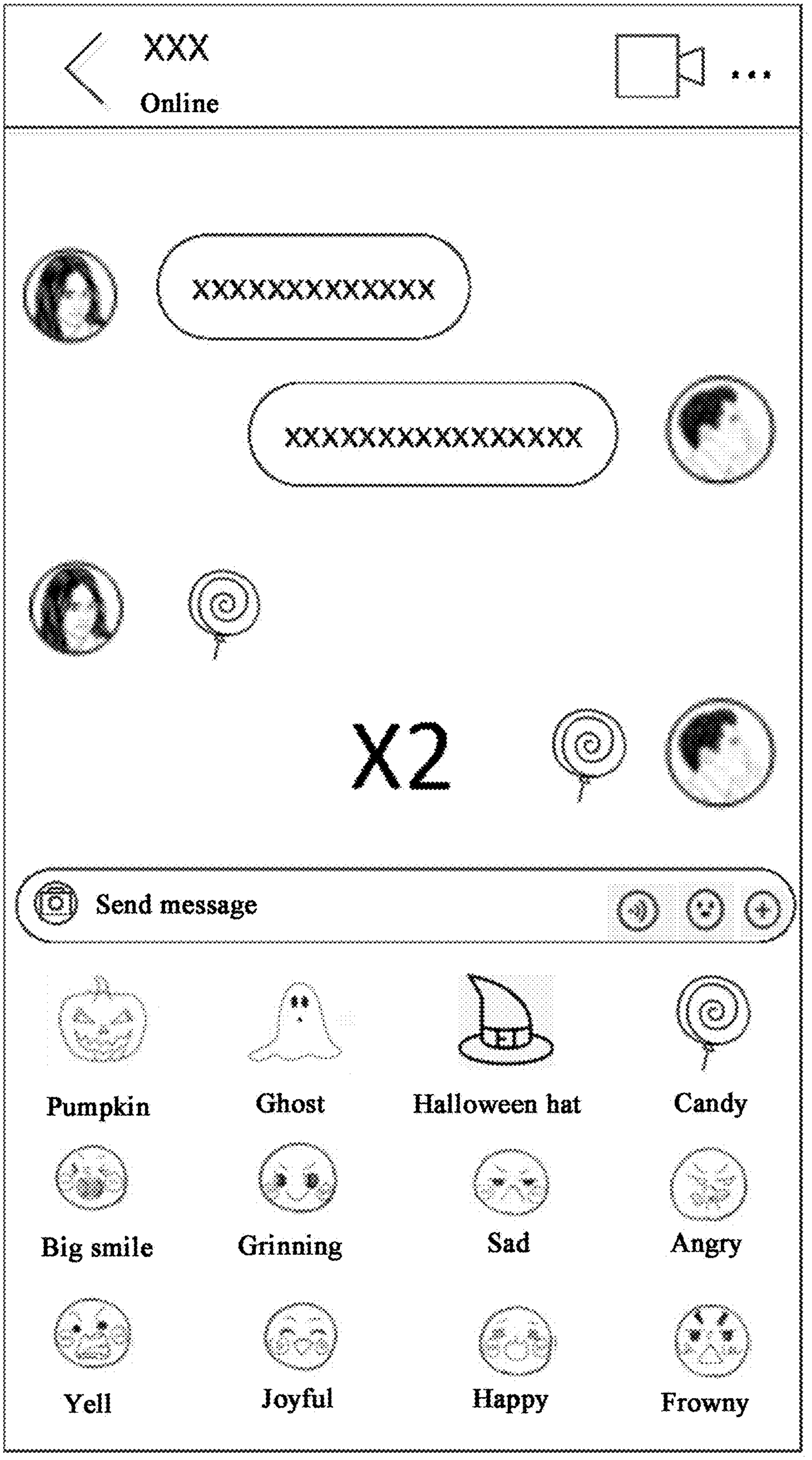
FIG. 11 is a schematic diagram of an animation created by repetitively clicking an emoji according to an example embodiment of the disclosure.

FIG. 10 is a flow chart of a method of emoji display according to a further example embodiment of the disclosure. FIG. 11 is a schematic diagram of an animation created by repetitively clicking an emoji according to an example embodiment of the disclosure. As illustrated in FIG. 10 and FIG. 11, a method of emoji display provided according to this embodiment comprises:

Step 301: a first emoji is repetitively sent in a target conversation on a target interface;

Step 302: a fourth animation is triggered to be played on an interface of the target conversation;

wherein the fourth animation is an animation created by repetitively clicking the first emoji.

It is understood that, embodiments of the disclosure have no limitations on an emoji being triggered for repetitive-click animation, and any emoji may be triggered for the repetitive-click animation.

It is understood that, embodiments of the disclosure have no limitations on the number of times of repeated sending of the first emoji when triggering a repetitive-click animation, which, for example, may be 2, 3, 4, 5. Exemplarily, if the number of times of repetitively sending the first icon exceeds 2, a fourth animation may be triggered to be played.

Exemplarily, a repetitive-click effect of the fourth animation may be "x2," "x3," or "x4," as illustrated in FIG. 11.

Optionally, the fourth animation automatically disappears after being completely played.

Optionally, the fourth animation, while being played, does not block the user's operation on the conversation interface, so that the user may conduct conversation normally on the conversation interface.

In a case of triggering repetitive sending of a first emoji in the target conversation on a conversation interface, the method of emoji display provided according to embodiments of the disclosure enables playing of an animation created by repetitively clicking the first emoji on an interface of the target conversation, whereby emoji interactivity is enhanced, and fun of conversation is improved.

Figure 12:
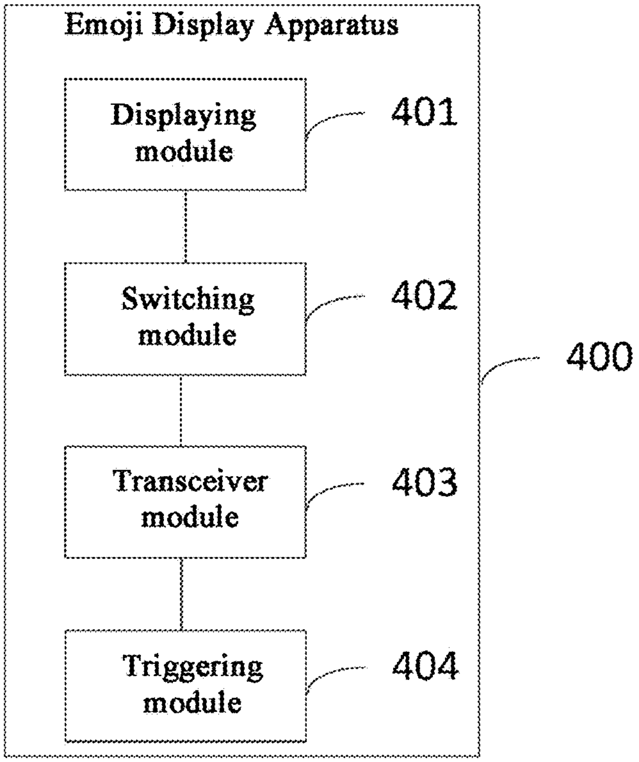
FIG. 12 is a structural schematic diagram of an information interaction apparatus according to an example embodiment of the disclosure.

FIG. 12 is a structural schematic diagram of an information interaction apparatus according to an example embodiment of the disclosure. As illustrated in FIG. 12, an apparatus 400 for emoji display according to embodiments of the disclosure comprises:

a displaying module 401 configured to display, on an input panel of a conversation interface, at least one preset masked icon;

a switching module 402 configured to display a first emoji in a first emoji set on the input panel, responsive to a triggering on the preset masked icon, to switch the preset masked icon.

According to one or more embodiments of the disclosure, the displaying module 401 is specifically configured to display, responsive to a display instruction for the first emoji set, on the input panel of the conversation interface, the at least one preset masked icon, wherein the display instruction is triggered responsive to satisfaction of a preset condition.

According to one or more embodiments of the disclosure, the apparatus further comprises:

a transceiver module 403 configured to receive, in a target conversation on the conversation interface, a second emoji; and a triggering module 404 configured to trigger, in a case that the second emoji belongs to a second emoji set, the display instruction for the first emoji set.

According to one or more embodiments of the disclosure, the second emoji set includes the first emoji set, or the second emoji set is associated with the first emoji set.

According to one or more embodiments of the disclosure, the triggering module 404 is further configured to obtain current time, and trigger, in a case that the current time is within a target timeslot, the display instruction for the first emoji set, wherein the first emoji set is associated with the target timeslot.

According to one or more embodiments of the disclosure, the triggering module 404 is further configured to obtain, based on a target setting of a user with respect to a target conversation on the conversation interface and/or user input, a preset theme, the preset theme being associated with the first emoji set; and trigger, responsive to satisfaction of a trigger condition corresponding to the preset theme, the display instruction for the first emoji set.

According to one or more embodiments of the disclosure, the displaying module 401 is further configured to display, responsive to the trigger operation on the preset masked icon, an animated effect of the first emoji in the first emoji set switched from the preset masked icon.

According to one or more embodiments of the disclosure, the transceiver module 403 is further configured to send or receive, in the target conversation on the conversation interface, the first emoji; and the display module 401 is further configured to play, in a case that the target conversation on the conversation interface includes the first emoji and a third emoji, on an interface of the target conversation, a first animation;

wherein the first animation is an animation associated with the first emoji and the third emoji.

According to one or more embodiments of the disclosure, the third emoji belongs to a second emoji set, the second emoji set belongs to the first emoji set, or the second emoji set is associated with the first emoji set.

According to one or more embodiments of the disclosure, the displaying module is further configured to redirect, response to a first interactive operation on the first animation, the first animation which is played till a preset time node, to a second animation, and display the second animation;

wherein the first interactive operation is an operation on a first play area of the first animation, the second animation is a feedback animation with respect to the first interactive operation.

According to one or more embodiments of the disclosure, the displaying module 401 is further configured to trigger, responsive to a second interactive operation on the first animation, a first task for the first animation; wherein the first task comprises at least one of: recording the first animation, saving the first animation, and sharing the first animation.

According to one or more embodiments of the disclosure, the transceiver module 403 is further configured to send or receive, in the target conversation on the conversation interface, a fourth emoji;

The displaying module 401 is further configured to play, in a case that the target conversation on the conversation interface includes the first emoji, the third emoji, and the fourth emoji, a second animation on an interface of the target conversation;

wherein the second animation is an animation associated with the first emoji, the third emoji, and the fourth emoji, the third emoji and the fourth emoji belonging to the second emoji set, the second emoji set including the first emoji set, or the second emoji set being associated with the first emoji set.

According to one or more embodiments of the disclosure, in a case that playing of the second animation is triggered while the first animation is being played, a play interval between the first animation and the second animation is greater than a preset time length.

According to one or more embodiments of the disclosure, triggering play of the second animation is suspended while the first animation is being played.

According to one or more embodiments of the disclosure, triggering play of the third animation is suspended while the first animation is being played;

wherein the third animation is an animation associated with the third emoji and a fourth emoji, both the third emoji and the fourth emoji belonging to the second emoji set, the second emoji set including the first emoji set, or the second emoji set being associated with the first emoji set.

According to one or more embodiments of the disclosure, the displaying module 401 is further configured to play, in a case that repetitively sending of the first emoji is triggered in the target conversation on the conversation interface, on the interface of the target conversation, a fourth animation;

wherein the fourth animation is an animation created by repetitively clicking the first emoji.

According to one or more embodiments of the disclosure, the transceiver module 403 is further configured to send, when switching, on the input panel, the preset masked icon to the first emoji in the first emoji set to display the first emoji, the first emoji to the target conversation on the conversation interface.

It is noted that the apparatus for emoji display illustrated in FIG. 12 is configurable to perform the method according to any embodiment described supra, with similar implementations and technical effects to the method embodiments, which are thus not detailed here.

Figure 13:
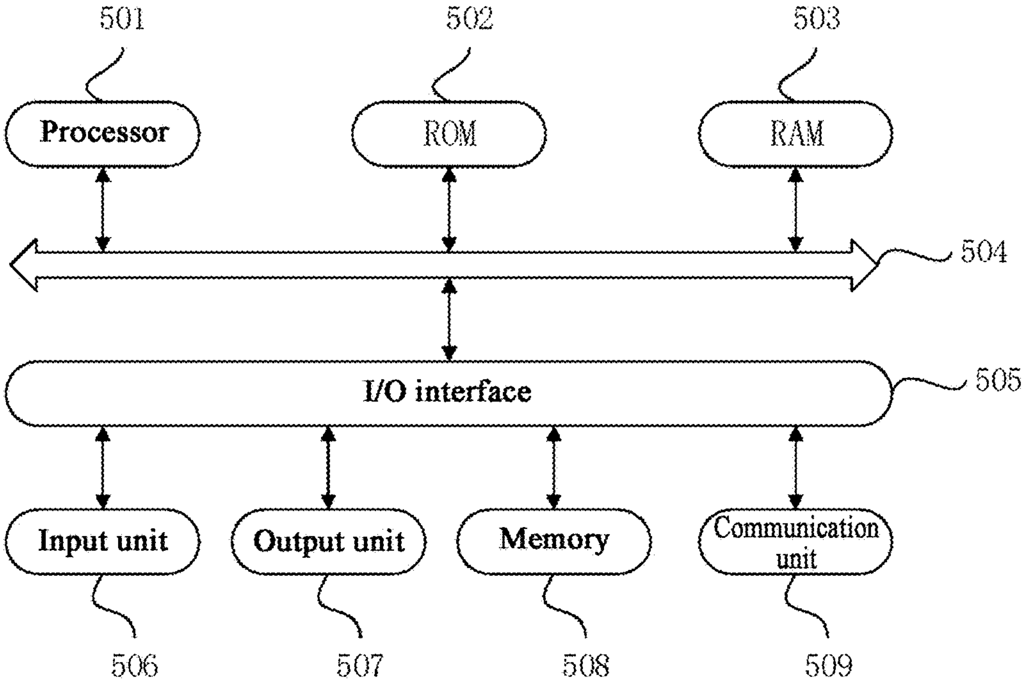
FIG. 13 is a structural schematic diagram of an electronic device according to an example embodiment of the disclosure.

FIG. 13 is a structural schematic diagram of an electronic device according to an example embodiment of the disclosure. FIG. 13 illustrates a structural schematic diagram of an electronic device 500 adapted to implement embodiments of the disclosure. The terminal device referred to in the embodiments of the disclosure may include, but is not limited to, a mobile terminal with an image acquisition feature, such as a mobile phone, a laptop computer, a digital broadcast receiver, a PDA (Personal Digital Assistant), a PAD (Tablet), a PMP (Portable Media Player), or a vehicle-mounted terminal (e.g., a vehicle-mounted navigation terminal), or a wearable electronic device, and a fixed terminal with an image acquisition feature, such as a digital TV or a desktop computer. The electronic device illustrated in FIG. 13 is only exemplary, which should not constitute any limitation to the functions and scope of use of the embodiments of the disclosure.

As illustrated in FIG. 13, the electronic device 500 may comprise a processing unit (e.g., a Center Processing Unit, a Graphic Processing Unit, etc.) 501, which may execute various suitable actions and processing based on the program stored in a read-only memory (ROM) 502 or a program loaded in the random-access memory (RAM) 503 from a storage unit 508. The RAM 503 can also store all kinds of programs and data necessary to operation of the electronic device 500. The processing device 501, ROM 502 and RAM 503 are interconnected to each other via a bus 504. The input/output (I/O) interface 505 is also connected to the bus 504. The RAM 503 is configured to store a program which executes the method according to various method embodiments; the processor is configured to execute the program stored in the RAM to implement functions of the embodiments of the disclosure and/or other desired functions.

Generally, the following devices may be connected to the I/O interface 505: an input unit 506 including, e.g., a touch screen, a touch pad, a keypad, a mouse, a camera, a microphone, an accelerometer, or a gyroscope; an output unit 507, e.g., a LCD (Liquid Crystal Display), a loudspeaker, or a vibrator; a storage unit 508 such as a magnetic tape, a hard disk; and a communication unit 509. The communication unit 509 allows the electronic device 500 to exchange information/data with other devices via wireless or cable communication. Although the electronic device 500 comprising various components is shown in FIG. 5, it is understood that it is not required to implement or possess all of the illustrated components. Alternatively, more or less components may be implemented or possessed.

Particularly, according to the embodiments of the disclosure, the processes described with reference to the above flow diagram may be implemented as computer software programs. For example, embodiments of the disclosure comprise a computer program product comprising a computer program carried on the computer-readable medium, the computer program including program codes for performing the methods illustrated in the flow diagram. In such embodiments, the computer program may be downloaded and installed from the network via the communication unit 509, or installed from the storage unit 508, or installed from the ROM 502. When the computer program is executed by the processing unit 501, the actions defined by the methods according to the embodiments of the disclosure are implemented.

It is noted that, the computer-readable medium described supra may be a computer-readable signal medium or a computer-readable storage medium or any combination of the above. The computer-readable storage medium for example may be, but is not limited to, electric, magnetic, optical, electro-magnetic, infrared or semiconductor system, apparatus or device, or any combination thereof. More specific examples of the computer-readable storage medium include, but are not limited to, an electric connection via one or more wires, a portable computer magnetic disk, hard disk, random access memory (RAM), read-only memory (ROM), erasable programmable read-only memory (EPROM or flash memory), optical fiber, portable compact-disc read-only storage medium (CD-ROM), optical storage device, magnetic storage device, or any appropriate combination thereof. In the disclosure, the computer-readable storage medium may refer to any tangible medium including or storing a program that can be used by an instruction executing system, apparatus or device or used by a combination thereof. However, in the disclosure, the computer-readable signal medium may include data signals in the base band or propagated as a part of carrier, in which the computer-readable program codes are carried. This propagated data signals may take on various forms, including, but not limited to, electromagnetic signals, optical signals, or any suitable combination thereof. The computer-readable signal medium may also be any computer-readable medium other than the computer-readable storage medium, which computer-readable signal medium may transmit, propagate, or transfer a program used by the instruction executing system, apparatus or device, or used in combination therewith. The program code stored on the computer-readable medium may be transmitted via any appropriate medium including, but is not limited to, wires, cables, RFs (Radio Frequencies), etc., or any appropriate combination thereof.

The computer-readable medium may be included in the electronic device, or may be provided standalone without being assembled in the electronic device.

The computer-readable medium carries one or more programs, the one or more programs, when being executed by the electronic device, causing the electronic device to: display, on an input panel of a conversation interface, at least one preset masked icon; and displaying a first emoji in a first emoji set on the input panel, responsive to a triggering on the preset masked icon, to switch the preset masked icon.

The computer-program code for performing the operations of the disclosure may be compiled with one or more programming languages or a combination thereof; the programming languages comprise object-oriented programming languages, e.g., Java, Smalltalk, C++, and further comprise traditional procedural programming languages, such as “C” language or similar programming languages. The program codes can be executed completely on the user computer, partially on the user computer, as an independent software package, partially on the user computer and partially on the remote computer, or completely on the remote computer or server. In a scenario where a remote computer is involved, the remote computer can be connected to the user computer via any type of network, including local area network (LAN) and wide area network (WAN), or to the external computer (e.g., connected via Internet using the Internet service provider).

In some embodiments, the client and the server may communicate using any currently known or future developed network protocols such as HTTP (HyperText Transfer Protocol), and may be interconnected with a digital data communication (e.g., communication network) of any form or medium. Examples of the communication network include a local area network (“LAN”), a wide area network (“WAN”), a network of networks (e.g., the Internet), and a peer-to-peer network (e.g., an ad hoc peer-to-peer network), and any currently known or future developed network.

The flow diagrams and block diagrams in the drawings illustrate system architecture, functions and operations that may be implemented by the system, method and computer program product according to various embodiments of the disclosure. In this regard, each block in the flow diagram or block diagram can represent a module, a program snippet, or a part of code, wherein the module, the program snippet, or the part of code includes one or more executable instructions for performing specified logic functions. It is also noted that, in some alternative implementations, the functions indicated in the blocks can also occur in an order different from those indicated in the drawings. For example, two successively represented blocks can be actually executed in parallel and sometimes in a reverse order dependent on the concerned functions. It is also noted that, each block in the block diagram and/or flow diagram and a combination of the blocks in the block diagram and/or flow diagram may be implemented by a dedicated hardware-based system for executing specified functions or actions, or implemented by a combination of dedicated hardware and computer instructions.

The modules described in the embodiments of the disclosure may be implemented in a software manner or in a hardware manner, wherein the names of the modules do not constitute limitation to the unit per se in some circumstances.

The functions described herein may be executed at least partially by one or more hardware logic components. For example, an example hardware logic component that may be used includes, but is not limited to, a field programmable gate array (FPGA), an application-specific integrated circuit (ASIC), an application-specific standard product (ASSP), a system-on-chip (SOC), and a complex programmable logic device (CPLD), etc.

Within the context of the present disclosure, the machine-readable medium may be any tangible medium including or storing programs for or related to the instruction execution system, apparatus, or device. The machine readable medium may include, but is not limited to, electronic, magnetic, optical, electro-magnetic, infrared or semiconductor system, apparatus or device, or any combination thereof. More specific examples of the machine-readable storage medium include an electric connection via one or more wires, a portable computer magnetic disk, a hard disk, a random access memory (RAM), a read-only memory (ROM), an erasable programmable read-only memory (EPROM or flash memory), an optical storage device, a magnetic storage device, or any appropriate combination thereof.

In a first aspect, according to one or more embodiments of the disclosure, there is provided a method of emoji display, comprising:

displaying, on an input panel of a conversation interface, at least one preset masked icon; and displaying a first emoji in a first emoji set on the input panel, responsive to a triggering on the preset masked icon, to switch the preset masked icon.

According to one or more embodiments of the disclosure, the displaying, on an input panel of a conversation interface, at least one preset masked icon, comprises:

displaying, responsive to a display instruction for the first emoji set, on the input panel of the conversation interface, the at least one preset masked icon, wherein the display instruction is triggered responsive to satisfaction of a preset condition.

According to one or more embodiments of the disclosure, before the displaying, on an input panel of a conversation interface, at least one preset masked icon, the method further comprises:

receiving, in a target conversation on the conversation interface, a second emoji; and triggering, in a case that the second emoji belongs to a second emoji set, the display instruction for the first emoji set.

According to one or more embodiments of the disclosure, the second emoji set includes the first emoji set, or the second emoji set is associated with the first emoji set.

According to one or more embodiments of the disclosure, before the displaying, on an input panel of a conversation interface, at least one preset masked icon, the method further comprises:

obtaining current time; and triggering, in a case that the current time is within a target timeslot, the display instruction for the first emoji set, wherein the first emoji set is associated with the target timeslot.

According to one or more embodiments of the disclosure, before the displaying, on an input panel of a conversation interface, at least one preset masked icon, the method further comprises:

obtaining, based on a target setting of a user with respect to a target conversation on the conversation interface and/or user input, a preset theme, the preset theme being associated with the first emoji set; and triggering, responsive to satisfaction of a trigger condition corresponding to the preset theme, the display instruction for the first emoji set.

According to one or more embodiments of the disclosure, the displaying a first emoji in a first emoji set on the input panel, responsive to a triggering on the preset masked icon, to switch the preset masked icon comprises:

switching, responsive to the trigger operation on the preset masked icon, the preset masked icon to a first emoji in the first emoji set to display an animated effect of the first emoji.

According to one or more embodiments of the disclosure, the method further comprises:

sending or receiving, in the target conversation on the conversation interface, the first emoji; and playing, in a case that the target conversation on the conversation interface includes the first emoji and a third emoji, on an interface of the target conversation, a first animation;

wherein the first animation is an animation associated with the first emoji and the third emoji.

According to one or more embodiments of the disclosure, the third emoji belongs to a second emoji set, the second emoji set belongs to the first emoji set, or the second emoji set is associated with the first emoji set.

According to one or more embodiments of the disclosure, the method further comprises:

redirecting, response to a first interactive operation on the first animation, the first animation which is played till a preset time node, to a second animation, and displaying the second animation;

wherein the first interactive operation is an operation on a first play region of the first animation, the second animation is a feedback animation with respect to the first interactive operation.

According to one or more embodiments of the disclosure, the method further comprises:

triggering, responsive to a second interactive operation on the first animation, a first task for the first animation; wherein the first task comprises at least one of: recording the first animation, saving the first animation, and sharing the first animation.

According to one or more embodiments of the disclosure, the method further comprises:

sending or receiving, in the target conversation on the conversation interface, a fourth emoji;

playing, in a case that the target conversation on the conversation interface includes the first emoji, the third emoji, and the fourth emoji, a second animation on an interface of the target conversation;

wherein the second animation is an animation associated with the first emoji, the third emoji, and the fourth emoji, the third emoji and the fourth emoji belonging to the second emoji set, the second emoji set including the first emoji set, or the second emoji set being associated with the first emoji set.

According to one or more embodiments of the disclosure, in a case that playing of the second animation is triggered while the first animation is being played, a play interval between the first animation and the second animation is greater than a preset time length.

According to one or more embodiments of the disclosure, triggering play of the second animation is suspended while the first animation is being played.

According to one or more embodiments of the disclosure, triggering play of a third animation is suspended while the first animation is being played;

wherein the third animation is an animation associated with the third emoji and a fourth emoji, both the third emoji and the fourth emoji belonging to the second emoji set, the second emoji set including the first emoji set, or the second emoji set being associated with the first emoji set.

According to one or more embodiments of the disclosure, the method further comprises:

playing, in a case that repetitively sending of the first emoji is triggered in the target conversation on the conversation interface, on the interface of the target conversation, a fourth animation;

wherein the fourth animation is an animation created by repetitively clicking the first emoji.

According to one or more embodiments of the disclosure, the method further comprises:

sending, when switching, on the input panel, the preset masked icon to the first emoji in the first emoji set to display the first emoji, the first emoji to the target conversation on the conversation interface.

In a second aspect, according to one or more embodiments of the disclosure, there is provided an apparatus for emoji display, comprising:

a displaying module configured to display, on an input panel of a conversation interface, at least one preset masked icon;

a switching module configured to display a first emoji in a first emoji set on the input panel, responsive to a triggering on the preset masked icon, to switch the preset masked icon.

According to one or more embodiments of the disclosure, the displaying module is specifically configured to display, responsive to a display instruction for the first emoji set, on the input panel of the conversation interface, the at least one preset masked icon, wherein the display instruction is triggered responsive to satisfaction of a preset condition.

According to one or more embodiments of the disclosure, the apparatus further comprises:

a transceiver module configured to receive, in a target conversation on the conversation interface, a second emoji; and a triggering module configured to trigger, in a case that the second emoji belongs to a second emoji set, the display instruction for the first emoji set.

According to one or more embodiments of the disclosure, the second emoji set includes the first emoji set, or the second emoji set is associated with the first emoji set.

According to one or more embodiments of the disclosure, the triggering module is further configured to obtain current time, and trigger, in a case that the current time is within a target timeslot, the display instruction for the first emoji set, wherein the first emoji set is associated with the target timeslot.

According to one or more embodiments of the disclosure, the triggering module is further configured to obtain, based on a target setting of a user with respect to a target conversation on the conversation interface and/or user input, a preset theme, the preset theme being associated with the first emoji set; and trigger, responsive to satisfaction of a trigger condition corresponding to the preset theme, the display instruction for the first emoji set.

According to one or more embodiments of the disclosure, the displaying module is further configured to display, responsive to the trigger operation on the preset masked icon, an animated effect of the first emoji in the first emoji set switched from the preset masked icon.

According to one or more embodiments of the disclosure, the transceiver module is further configured to send or receive, in the target conversation on the conversation interface, the first emoji; and the display module is further configured to play, in a case that the target conversation on the conversation interface includes the first emoji and a third emoji, on an interface of the target conversation, a first animation;

wherein the first animation is an animation associated with the first emoji and the third emoji.

According to one or more embodiments of the disclosure, the third emoji belongs to a second emoji set, the second emoji set belongs to the first emoji set, or the second emoji set is associated with the first emoji set.

According to one or more embodiments of the disclosure, the displaying module is further configured to redirect, response to a first interactive operation on the first animation, the first animation which is played till a preset time node, to a second animation, and display the second animation;

wherein the first interactive operation is an operation on a first play area of the first animation, the second animation is a feedback animation with respect to the first interactive operation.

According to one or more embodiments of the disclosure, the displaying module is further configured to trigger, responsive to a second interactive operation on the first animation, a first task for the first animation; wherein the first task comprises at least one of: recording the first animation, saving the first animation, and sharing the first animation.

According to one or more embodiments of the disclosure, the transceiver module is further configured to send or receive, in the target conversation on the conversation interface, a fourth emoji;

The displaying module is further configured to play, in a case that the target conversation on the conversation interface includes the first emoji, the third emoji, and the fourth emoji, a second animation on an interface of the target conversation;

wherein the second animation is an animation associated with the first emoji, the third emoji, and the fourth emoji, the third emoji and the fourth emoji belonging to the second emoji set, the second emoji set including the first emoji set, or the second emoji set being associated with the first emoji set.

According to one or more embodiments of the disclosure, in a case that playing of the second animation is triggered while the first animation is being played, a play interval between the first animation and the second animation is greater than a preset time length.

According to one or more embodiments of the disclosure, triggering play of the second animation is suspended while the first animation is being played.

According to one or more embodiments of the disclosure, triggering play of the third animation is suspended while the first animation is being played;

wherein the third animation is an animation associated with the third emoji and a fourth emoji, both the third emoji and the fourth emoji belonging to the second emoji set, the second emoji set including the first emoji set, or the second emoji set being associated with the first emoji set.

According to one or more embodiments of the disclosure, the displaying module is further configured to play, in a case that repetitively sending of the first emoji is triggered in the target conversation on the conversation interface, on the interface of the target conversation, a fourth animation;

wherein the fourth animation is an animation created by repetitively clicking the first emoji.

According to one or more embodiments of the disclosure, the transceiver module is further configured to send, when switching, on the input panel, the preset masked icon to the first emoji in the first emoji set to display the first emoji, the first emoji to the target conversation on the conversation interface.

In a third aspect, embodiments of the disclosure provide an electronic device, comprising:

a processor; and a memory having a computer program stored thereon;

wherein the processor is configured to execute the computer program to perform the method of emoji display according to the first aspect or various possible designs of the first aspect.

In a fourth aspect, embodiments of the disclosure provide a computer-readable storage medium with a computer-executed instruction stored thereon, wherein the computer-executed instruction, when being executed by a processor, performs the method of emoji display according to according to the first aspect noted supra and various possible designs of the first aspect.

In a fifth aspect, embodiments of the disclosure provide a computer program product, comprising a computer program, wherein the computer program, when being executed by a processor, performs the method of emoji display according to the first aspect noted supra and various possible designs of the first aspect.

In a sixth aspect, embodiments of the disclosure provide a computer program, wherein the computer program, when being executed by a processor, performs the method of emoji display according to the first aspect noted supra and various possible designs of the first aspect.

What have been described above are only illustrations of the preferred embodiments of the disclosure and the technical principles applied thereby. Those skilled in the art should understand that the scope of the disclosure herein is not limited to a technical solution formed by specific combinations of the technical features described supra, which should also encompass other technical solutions formed by any combination of the above technical features or equivalent features without departing from the idea described supra, e.g., a technical solution formed by mutual substitution between the above features and the technical features with similar functions as disclosed (but not limited to) herein.

In addition, although various operations are described in a specific order, it should not be construed such that these operations must be performed in the specific order as illustrated or in a sequential order. In certain circumstances, multi-task parallel processing can be advantageous. Likewise, although a plurality of specific implementation details have been described supra, these details should not be construed as limiting the scope of the disclosure. Some features described within the context of individual embodiments may also be combined to be implemented in a single embodiment. In turn, various features described within the context of a single embodiment may also be implemented in a plurality of embodiments separately or in any appropriate sub-combination manner.

Although the subject matter has been described with languages specific to structural features and/or method logic actions, it would be understood that the subject matter limited in the appended claims is not necessarily limited to the specific features or actions described supra. On the contrary, the specific features and actions described supra are only exemplary forms of implementing the claims.

We claim:

1. A method of emoji display, comprising:

displaying, on an input panel of a conversation interface, at least one preset masked icon;

displaying a first emoji in a first emoji set on the input panel, responsive to a triggering on the preset masked icon, to switch the preset masked icon;

playing, in response to the conversation interface including the first emoji and a third emoji, a first animation on the conversation interface; and playing, in response to the conversation interface including the first emoji, the third emoji, and a fourth emoji, a second animation on the conversation interface, wherein the method further comprises:

suspending a play of the second animation while the first animation is being played; or setting a play interval between the first animation and the second animation.

2. The method of claim 1, wherein displaying a first emoji in a first emoji set on the input panel, responsive to a triggering on the preset masked icon, to switch the preset masked icon, comprises:

displaying, responsive to the triggering on the preset masked icon, an animated effect of the preset masked icon being switched to display the first emoji in the first emoji set.

3. The method of claim 1, further comprising:

sending or receiving, in a target conversation on the conversation interface, the first emoji;

wherein the first animation is an animation associated with the first emoji and the third emoji.

4. The method of claim 3, wherein the third emoji belongs to a second emoji set, the second emoji set belongs to the first emoji set, or the second emoji set is associated with the first emoji set.

5. The method of claim 3, further comprising:

redirecting, responsive to a first interactive operation on the first animation, the first animation which is played till a preset time node, to the second animation, and displaying the second animation;

wherein the first interactive operation is an operation on a first play region of the first animation, the second animation is a feedback animation with respect to the first interactive operation.

6. The method of claim 3, further comprising:

triggering, responsive to a second interactive operation on the first animation, a first task for the first animation; wherein the first task comprises at least one of: recording the first animation, saving the first animation, or sharing the first animation.

7. The method of claim 3, further comprising:

sending or receiving, in the target conversation on the conversation interface, the fourth emoji;

wherein the second animation is an animation associated with the first emoji, the third emoji, and the fourth emoji, the third emoji and the fourth emoji belong to a second emoji set, the second emoji set includes the first emoji set, or the second emoji set is associated with the first emoji set.

8. The method of claim 7, wherein in response to playing of the second animation being triggered while the first animation is being played, the play interval between the first animation and the second animation is greater than a preset time length.

9. The method of claim 3, wherein triggering playing of a third animation is suspended while the first animation is being played;

wherein the third animation is an animation associated with the third emoji and the fourth emoji, both the third emoji and the fourth emoji belong to the second emoji set, the second emoji set includes the first emoji set, or the second emoji set is associated with the first emoji set.

10. The method of claim 1, further comprising:

playing, in response to repetitively sending of the first emoji being triggered in a target conversation on the conversation interface, on an interface of the target conversation, a fourth animation;

wherein the fourth animation is an animation created by repetitively clicking the first emoji.

11. The method of claim 1, further comprising:

sending, when switching, on the input panel, the at least one preset masked icon to the first emoji in the first emoji set to display the first emoji, the first emoji to a target conversation on the conversation interface.

12. The method of claim 1, wherein the displaying, on an input panel of a conversation interface, at least one preset masked icon, comprises:

displaying, responsive to a display instruction for the first emoji set, on the input panel of the conversation interface, the at least one preset masked icon, wherein the display instruction is triggered responsive to satisfaction of a preset condition.

13. The method of claim 12, wherein before the displaying, on an input panel of a conversation interface, at least one preset masked icon, the method further comprises:

receiving, in a target conversation on the conversation interface, a second emoji; and triggering, in response to the second emoji being belonging to a second emoji set, the display instruction for the first emoji set.

14. The method of claim 13, wherein the second emoji set includes the first emoji set, or the second emoji set is associated with the first emoji set.

15. The method of claim 12, wherein before the displaying, on an input panel of a conversation interface, at least one preset masked icon, the method further comprises:
obtaining current time; and
triggering, in response to the current time being within a target timeslot, the display instruction for the first emoji set, wherein the first emoji set is associated with the target timeslot.

16. The method of claim 12, wherein before the displaying, on an input panel of a conversation interface, at least one preset masked icon, the method further comprises:
obtaining, based on user input and a target setting of a user with respect to a target conversation on the conversation interface, a preset theme, the preset theme being associated with the first emoji set; and
triggering, in response to a trigger condition corresponding to the preset theme being satisfied, the display instruction for the first emoji set.

17. An electronic device, comprising:
a processor; and
a memory having a computer program stored thereon;
wherein the processor is configured to execute the computer program to cause the processor to:
display, on an input panel of a conversation interface, at least one preset masked icon;
display a first emoji in a first emoji set on the input panel, responsive to a triggering on the preset masked icon, to switch the preset masked icon;
play, in response to the conversation interface including the first emoji and a third emoji, a first animation on the conversation interface; and
play, in response to the conversation interface including the first emoji, the third emoji, and a fourth emoji, a second animation on the conversation interface,
wherein the processor is further caused to:
suspend a play of the second animation while the first animation is being played; or
set a play interval between playing the first animation and the second animation.

18. The electronic device of claim 17, wherein the processor is further caused to:
display, responsive to a display instruction for the first emoji set, on the input panel of the conversation interface, the at least one preset masked icon, wherein the display instruction is triggered responsive to satisfaction of a preset condition.

19. A non-transitory computer-readable storage medium with computer-executable instructions stored thereon, wherein the computer-executable instructions, when executed by a processor, cause the processor to:
display, on an input panel of a conversation interface, at least one preset masked icon;
display a first emoji in a first emoji set on the input panel, responsive to a triggering on the preset masked icon, to switch the preset masked icon;
play, in response to the conversation interface including the first emoji and a third emoji, a first animation on the conversation interface; and
play, in response to the conversation interface including the first emoji, the third emoji, and a fourth emoji, a second animation on the conversation interface,
wherein the processor is further caused to:
suspend a play of the second animation while the first animation is being played; or
set a play interval between the first animation and the second animation.

* * * * *